United States Patent [19]
Yagi et al.

[11] Patent Number: 5,405,301
[45] Date of Patent: Apr. 11, 1995

[54] AUTOMATIC TRANSMISSION CONTROL SYSTEM

[75] Inventors: Yoshifumi Yagi, Okazaki; Kiyoyuki Uchida, Toyota, both of Japan

[73] Assignee: Toyota Jidosha Kabushiki Kaisha, Toyota, Japan

[21] Appl. No.: 42,097

[22] Filed: Apr. 1, 1993

[30] Foreign Application Priority Data

Jun. 15, 1992 [JP] Japan .................. 4-155298

[51] Int. Cl.6 ............................................ B60K 41/00
[52] U.S. Cl. ..................................... 477/120; 180/197
[58] Field of Search ................ 180/197; 477/110, 120, 477/143, 149, 155

[56] References Cited

U.S. PATENT DOCUMENTS

| | | | |
|---|---|---|---|
| 4,996,893 | 3/1991 | Nakamura et al. | 477/120 |
| 5,047,940 | 9/1991 | Onaka et al. | 364/426.2 |
| 5,060,746 | 10/1991 | Nobumoto et al. | 180/197 |
| 5,103,398 | 4/1992 | Akiyama | 180/197 |
| 5,105,360 | 4/1992 | Akiyama | 180/197 |
| 5,191,953 | 3/1993 | Ito et al. | 180/197 |

FOREIGN PATENT DOCUMENTS

| | | |
|---|---|---|
| 0301558 | 2/1989 | European Pat. Off. . |
| 3711913 | 10/1988 | Germany . |
| 3927349 | 2/1990 | Germany . |
| 58-38347 | 3/1983 | Japan . |
| 1-218932 | 9/1989 | Japan . |

*Primary Examiner*—Michael Koczo, Jr.
*Attorney, Agent, or Firm*—Kenyon & Kenyon

[57] ABSTRACT

In an automatic transmission control system provided for an internal combustion engine having an automatic transmission system equipped with a traction control system in which a throttle valve is adjusted towards a closed state from a throttle position corresponding to an operation of an accelerator pedal when wheel slippage occurs, a detection unit detects a degree of operation of the accelerator pedal. A shift point changing unit changes a shift point so that gear shifting occurs on the basis of the degree of operation of the accelerator pedal in a normal state and gear shifting occurs at an engine speed lower than a predetermined engine speed at which gear shifting normally occurs when the degree of operation of the accelerator pedal is equal to or greater than a predetermined value.

3 Claims, 8 Drawing Sheets

AUTOMATIC TRANSMISSION CONTROL SYSTEM

BACKGROUND OF THE INVENTION

1. Field of the Invention

The present invention generally relates to an automatic transmission control system, and more particularly to an automatic transmission control system used in cooperation with an acceleration slip control system for preventing slippage of the driving wheels that tends to happen during starting and acceleration.

2. Description of Related Art

An acceleration slip control system is known which prevents slippage of the driving wheels of a vehicle during starting and acceleration, so that the straight line stability and accelerating ability of the vehicle can be improved. Generally, the above-mentioned acceleration slip control system employs feedback control of the driving torque. In such a feedback control system, a target value of the driving wheel speed is defined, and the driving torque is controlled so that the quantity of slip defined as the difference between the actual driving wheel speed and the target value is equal to or less than a threshold value. Hereinafter, the above-mentioned feedback control of the driving torque is referred to as a traction control (TRC). A means for controlling the driving torque is made up of a main throttle valve cooperating with manipulation of the accelerator pedal, and a sub-throttle valve driven by a driving means, such as a stepping motor. When the vehicle slips, the acceleration slip control system drives the sub-throttle valve towards the closed state. In this manner, the driving torque is reduced and wheel slippage can be prevented.

The automatic transmission control system used in cooperation with the above acceleration slip control system performs, when the TRC is OFF, a shift control suitable for the current driving conditions which can be detected from the opening ratio of the main throttle valve and the vehicle speed. Information indicating the opening ratio of the main throttle valve is obtained from the sensor output signal of a throttle valve opening ratio sensor, and information indicating the vehicle speed is obtained from the sensor output signal of a speed sensor. When the TRC is ON, the shift control is carried out on the basis of an estimated throttle valve opening ratio and the vehicle speed. The estimated throttle valve opening ratio can be obtained from an equivalent value corresponding to the quantity of cylinder intake air. More particularly, the above equivalent value can be expressed as Q/N, where Q denotes the intake air quantity, and N denotes the engine speed. The above-mentioned automatic transmission control system is disclosed in, for example, Japanese Laid-Open Patent Publication No. 1-218932.

It can be said that the shift control based on the estimated throttle valve opening ratio and the vehicle speed is substantially equivalent to a shift control based on the sub-throttle valve opening ratio.

There is a disadvantage in the shift control based on the main valve opening ratio. When the accelerator pedal is deeply depressed in a state in which the vehicle is on a slippery road like an iced road, the engine speed at the time of up-shifting is very high even when the TRC is ON. Up-shifting causes a large amount of wheel slip and hence the vehicle condition becomes unstable.

There is a disadvantage in the shift control based on the sub-throttle valve opening ratio. Depression of the accelerator pedal does not rapidly cause down-shifting. If the driver continues to depress the accelerator pedal, a down-shifting change will abruptly take place (at the end of the shifting process based on the sub-throttle valve opening ratio). In other words, the driver cannot predict when down-shifting will take place and hence feels uncomfortable.

SUMMARY OF THE INVENTION

It is a general object of the present invention to provide an automatic transmission control system in which the above disadvantages are eliminated.

A more specific object of the present invention is to provide an automatic transmission control system capable of suppressing wheel slippage that occurs when gear shifting is performed.

The above objects of the present invention are achieved by an automatic transmission control system provided for an internal combustion engine having an automatic transmission system equipped with a traction control system in which a throttle valve is adjusted towards a closed state, from a throttle position corresponding to the operation of an accelerator pedal, when wheel slippage occurs, the automatic transmission control system comprising:

a detection unit for detecting a degree of operation of the accelerator pedal; and a shift point changing unit, coupled to the detection unit, for changing a shift point so that gear shifting occurs on the basis of the degree of operation of the accelerator pedal in a normal state and gear shifting occurs at an engine speed lower than a predetermined engine speed at which gear shifting normally occurs when the degree of operation of the accelerator pedal is equal to or greater than a predetermined value.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 1:
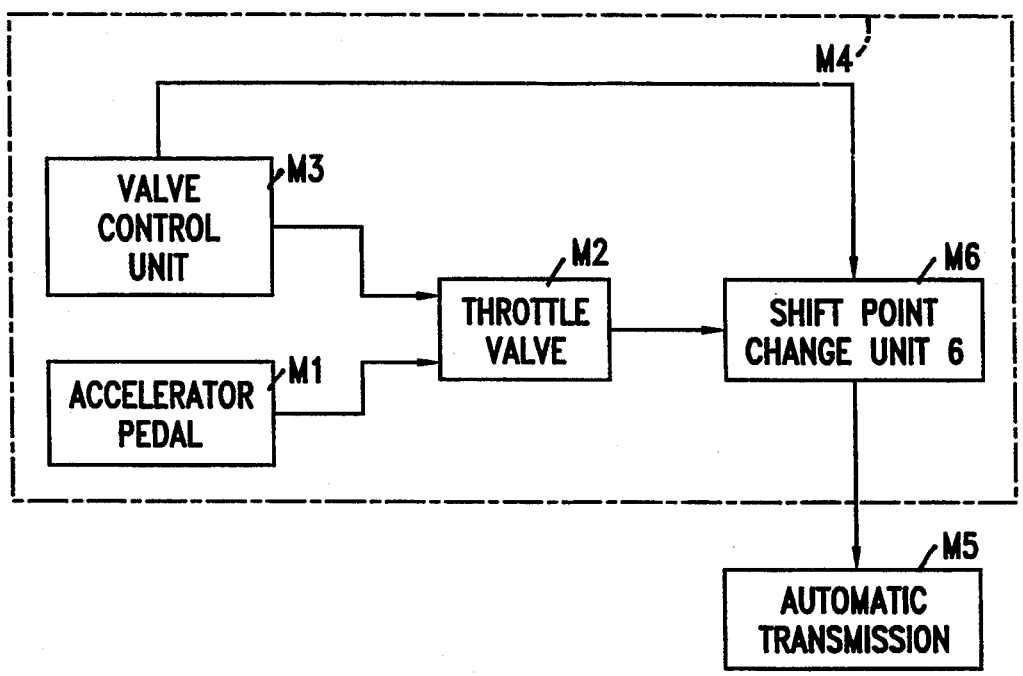
FIG. 1 is a block diagram illustrating an overview of the present invention.

FIG. 1 illustrates an overview of the present invention. An automatic transmission control system that controls an automatic transmission M5 includes an accelerator pedal M1, a throttle valve M2, a valve control unit M3, and a shift point change unit M6. M4 denotes an internal combustion engine. The shift point change unit M6 changes the shift point towards a low engine speed when the quantity of depression (degree of operation or setting) of the accelerator pedal M1 becomes equal to or greater than a threshold value. Hence, wheel slippage can be prevented when the accelerator pedal M1 is deeply depressed.

The automatic transmission performs shift control on the basis of the opening ratio of the throttle valve M2 and the vehicle speed. It will now be assumed that the vehicle is traveling on a slippery road (low-$\mu$ road), such as an iced road while the traction control (TRC) is ON and the throttle valve M2 is maintained in the closed state. When the driver depresses the accelerator pedal M1, the engine speed increases but the driving force is not transferred to the road because of wheel slippage. Hence, the vehicle speed does not increase. Since gear shifting is based on the opening ratio of the throttle valve and the vehicle speed, the engine speed increases to a high value until the vehicle speed reaches the shift point while the vehicle is traveling on the slippery (low-$\mu$) road.

When up-shifting occurs in the above state, the engine speed greatly decreases to the speed defined by a gear selected by the up-shifting. Hence, the driving wheels slip a great deal on the road and the behavior of the vehicle becomes extremely unstable.

According to the present invention, the shift point change unit M6 changes the shift point towards a low engine speed when the amount of operation of the accelerator pedal M1 becomes equal to or greater than the threshold value. Hence, the gear shifting occurs before the engine speed reaches a value causing a large amount of wheel slippage. Hence, wheel slippage because of gear shifting, particularly when the vehicle is traveling on a slippery road, can be prevented, and stable driving can be obtained.

A description will now be given of an embodiment of the present invention with reference to FIG. 2 which illustrates the entire structure of a vehicle equipped with a control system for an automatic transmission according to the present invention. An internal combustion engine 10 is mounted on a vehicle 1. Driving wheels 3a and 3b are driven by the engine 10 through an automatic transmission 5 and a drive shaft 26. The vehicle 1 also has idler wheels 4a and 4b. Wheel speed sensors 22a, 22b, 24a and 24b for respectively detecting wheel speeds of the driving wheels 3a and 3b and the idler wheels 4a and 4b are provided for these wheels.

A main throttle valve 14 responding to a driver's operation of an accelerator pedal 12 is provided in an air intake passage of the internal combustion engine 10. A sub-throttle valve 16 is fastened to the intake air passage and located on the upstream side of the main throttle valve 14. The sub-throttle valve 16 is driven by a stepping motor 18. A control unit 30 includes two integrated digital computers. One of the two digital computers functions as an electronic fuel injection (EFI) unit, and the other digital computer functions as an automatic transmission control (ECT) unit. The EFI unit performs fuel injection control and ignition timing control. The ECT unit performs shifting control of the automatic transmission 5.

The control unit 30 receives, as the EFI unit, a sensor output signal from an engine speed sensor 32, a sensor output signal from a main throttle valve opening ratio sensor 34, and a sensor output signal of a sub-throttle valve opening ratio sensor 36. Further, the control unit 30 receives sensor output signals from other sensors necessary for engine control as in the case of conventional engines. The control unit 30 is connected to a fuel injection valve 38 and an igniter 40. The control unit 30 controls the quantity of fuel injection and the ignition timing via the fuel injection valve 38 and the igniter 40. The control unit 30 controls, as the ECT unit, the shift point most suitable for the current driving conditions on the basis of a sensor output signal of a vehicle speed sensor 35 and data indicating a main throttle valve opening ratio $\theta_{MG}$ from the EFI unit.

Figure 2:
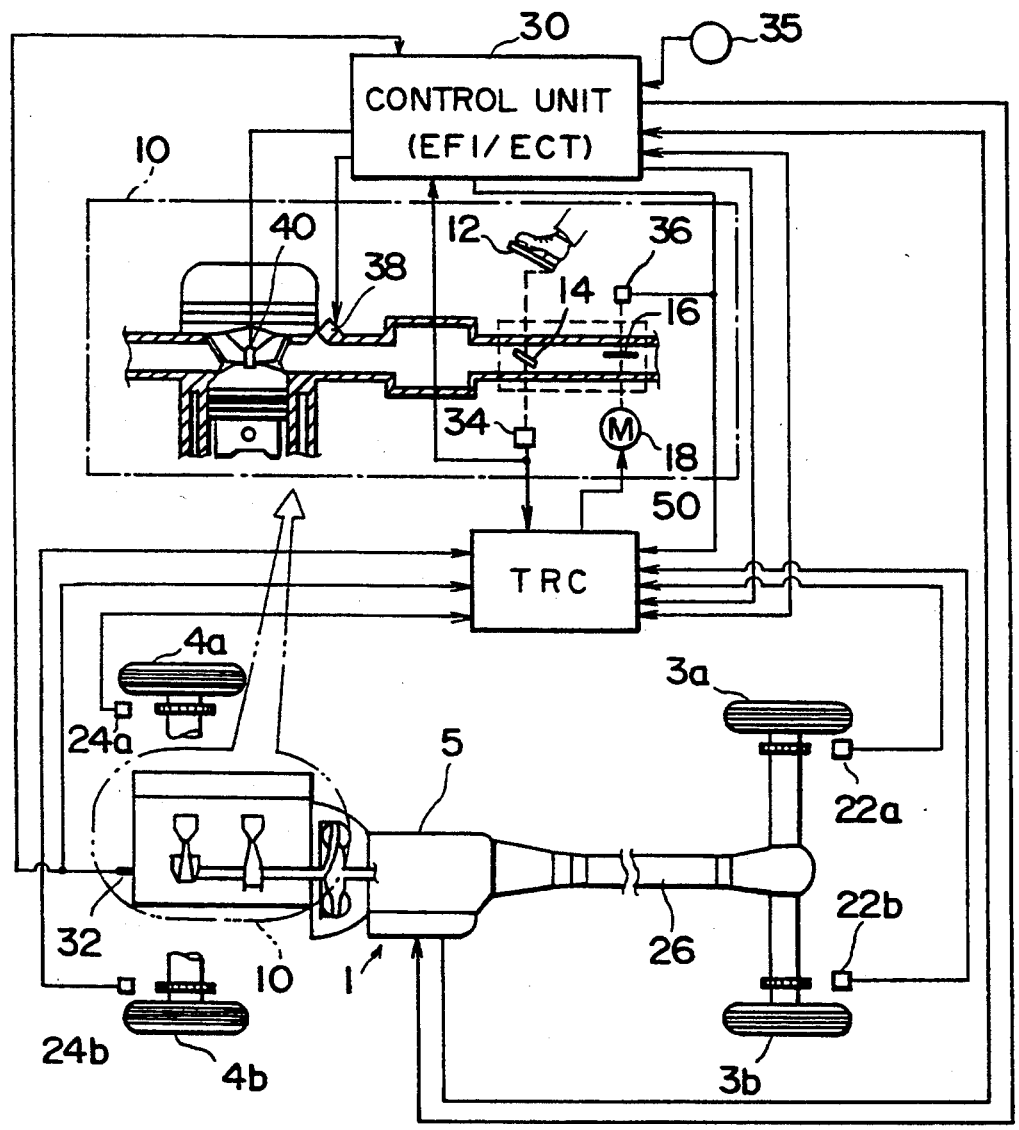
FIG. 2 is a diagram illustrating the entire structure of a vehicle to which an automatic transmission control system according to an embodiment of the present invention is applied.

The system shown in FIG. 2 includes an acceleration slip control unit (traction control unit: TRC unit) 50. The TRC unit 50 is formed with a digital computer, and is supplied with the sensor output signal of the engine speed sensor 32 and the sensor output signals of the main and sub-throttle valve opening ratio sensors 34 and 36 in order to perform the traction control. Further, the TRC unit 50 controls the opening ratio of the sub-throttle valve 16. Furthermore, the TRC unit 50 is connected to the control unit 30, and outputs a signal FS, a fuel cut signal and an ignition timing delay angle signal to the control unit 30. The FS signal indicates whether or not the TRC is performing a traction control operation.

The present embodiment carries out driving torque control by controlling the opening ratio of the sub-throttle valve 16 on the basis of slippage of the driving wheels 3a and 3b. The sub-throttle valve opening ratio $\theta_{s(n)}$ is controlled based on a slip quantity $_\Delta V$ of the driving wheels 3a and 3b, and is written as follows:

$$\theta_{s(n)} = \theta_{s(n-1)} + (d\theta_s/dt) \times T_O \quad (1)$$

$$(d\theta_s/dt) = K_1 \times {}_\Delta V + K_2 \times K_3 \times {}_\Delta G \quad (2)$$

where $\theta_{s(n-1)}$ denotes the sub-throttle opening ratio used in the previous computation, and $T_O$ denotes a computation executing period. Further, $K_1$, $K_2$ and $K_3$ are respectively positive constants, and $_\Delta V$ is the difference between a target driving wheel speed $V_S$ obtained from a vehicle speed (idler wheel speed) $V_B$, and the actual driving wheel speed $V_D$. In the present embodiment, the slip quantity $_\Delta V$ is defined as $V_S - V_D$. In equation (2), $_\Delta G$ is the difference between the ratio of variation of the vehicle speed $V_R$ and the rate of variation of the driving wheel speed $V_D$, that is, $|(dV_R/dt) - (dV_D/dt)|$.

Figure 3:
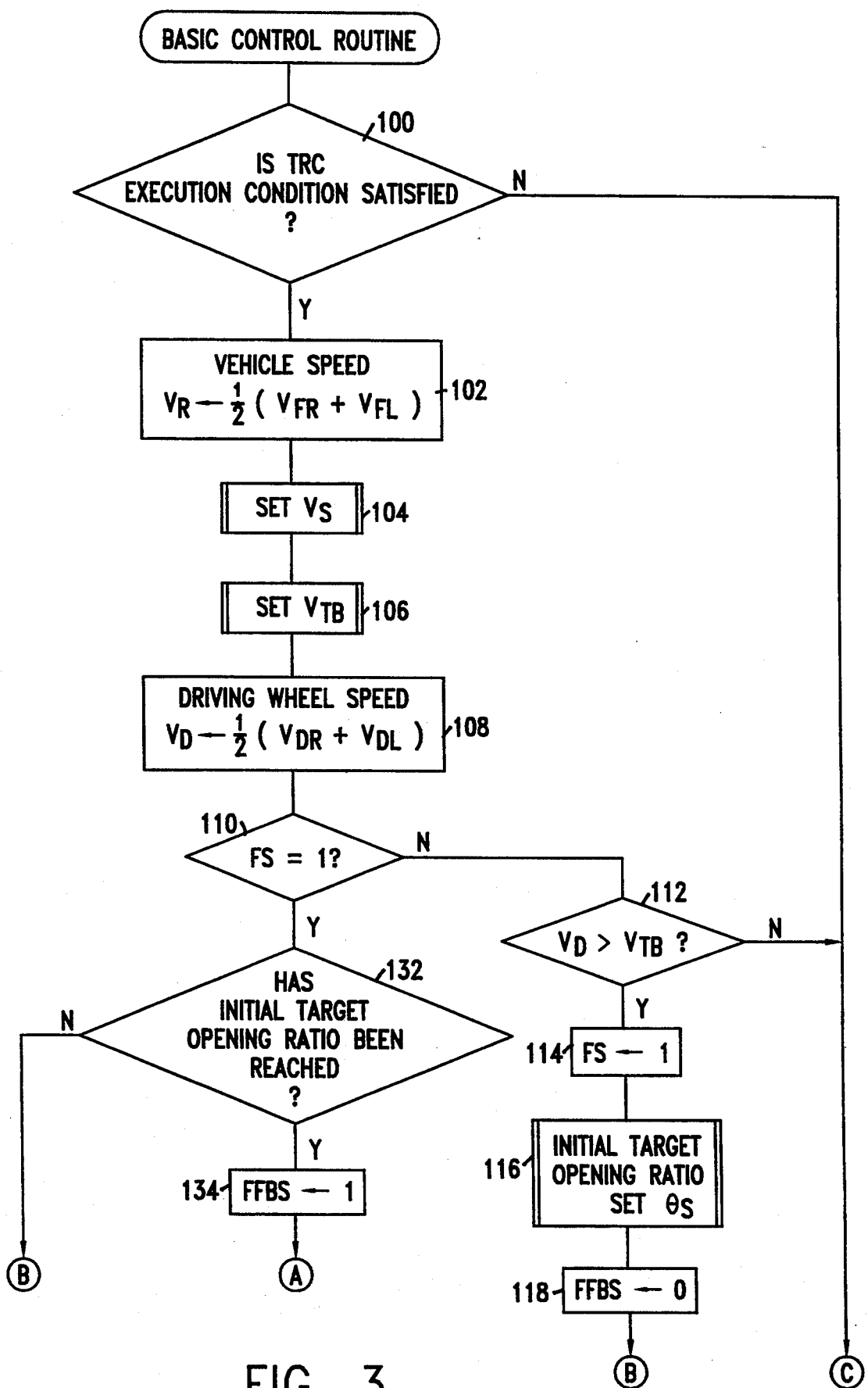
FIGS. 3 and 4 are flowcharts of a basic control process of a traction control.
Figure 4:
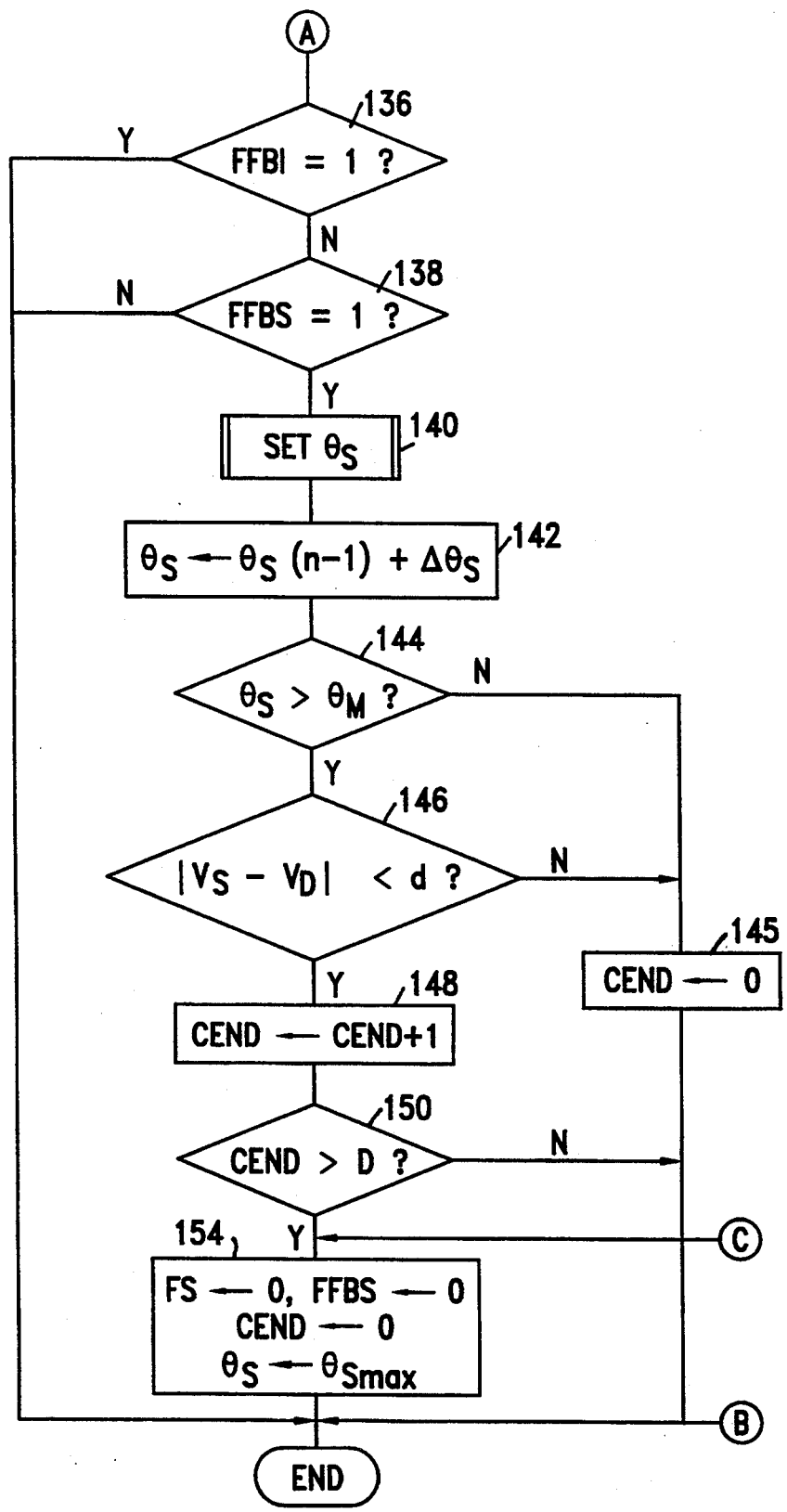

A description will now be given, with reference to FIGS. 3 and 4, of a basic operation of the operation according to the embodiment of the present invention. FIGS. 3 and 4 show a basic routine of the traction control operation performed by the TRC unit 50. The basic routine is repeatedly executed with a repetition period of, for example, 12 msec. In step 100, the TRC unit 50 determines whether or not a TRC execution condition is satisfied. In the embodiment of the present invention, the TRC execution condition is satisfied when the main throttle valve is not completely closed and the sensors are operating normally. When it is determined, in step 100, that the TRC execution condition is not satisfied, the TRC unit 50 executes step 154, in which step all flags are reset and $\theta_{smax}$(full throttle) is set as the sub-throttle valve opening ratio $\theta_s$. Then, the TRC unit 50 ends execution of the routine.

When it is determined, in step 100, that the TRC execution condition is satisfied, the TRC unit 50 computes the vehicle speed $V_R$ as follows:

$$V_R = (\tfrac{1}{2})(V_{FR} + V_{FL})$$

where $V_{FR}$ and $V_{FL}$ respectively denote the wheel speeds of the idler wheels 4a and 4b.

In step 104, the TRC unit 50 calculates the target driving wheel speed $V_S$ in the following manner:

[1] $V_S = V_R + 2.4$ km/h when $V_R \leq 30$ km/h
[2] $V_S = (V_R \times 1.08)$ km/h when $30$ km/h $< V_R \leq 100$ km/h
[3] $V_S = \text{MIN}[(V_R \times 1.08)\text{km/h}, (V_R + 10)\text{km/h}]$ when $100$ km/h $< V_R$ where MIN[x, y] is equal to x when x<y and is equal to y when y<x.

The target driving wheel speed $V_S$ is selected so that it is always greater than the vehicle speed $V_R$ and a predetermined slip occurs in the driving wheels. It can be seen from the above [1]-[3] that a target slip ratio $(V_S - V_R)/V_R$ is set to a large value when the vehicle speed is low so that the acceleration of the vehicle can be improved. When the vehicle speed is high, $V_S = V_R + 10$ km/h and the slip ratio is set low, so that the straight line stability of the vehicle can be improved.

In step 106, the TRC unit 50 sets a control starting speed $V_{TB}$ of the traction control. The control starting speed $V_{TB}$ is calculated as follows:

$$V_{TB} = V_S + \beta$$

where $\beta$ is a constant for making the control starting speed greater than the target driving wheel speed $V_S$ by $\beta$ in order to prevent frequent TRC control. More particularly, the constant $\beta$ is set between 2.0 km/h and 4 km/h on the basis of the road surface condition.

In step 108, the TRC unit 50 calculates the driving wheel speed $V_D$ by the following equation:

$$V_D = (\tfrac{1}{2})(V_{DR} + V_{DL})$$

where $V_{DR}$ and $V_{DL}$ respectively denote the wheel speeds of the driving wheels 3a and 3b.

After determining the speed parameters in steps 102-108, the TRC unit 50 determines whether or not the flag FS is equal to 1. When FS=0, the traction control is not started. In this case, the TRC unit 50 executes step 112 in which step it is determined whether $V_D > V_{TB}$ in order to determine whether or not the traction control might be needed. When it is determined, in step 112, that the control starting speed $V_{TB}$ is equal to or higher than the driving wheel speed $V_D$, the TRC unit 50 determines that the traction control is not needed and executes step 154 (FIG. 4) in which flags FS, FFBS and CEND are reset to zero, and the aforementioned $\theta_{smax}$(full throttle) is set as the sub-throttle valve opening ratio $\theta_s$.

When it is determined, in step 112 that the driving wheel speed $V_D$ is higher than the control starting speed $V_{TB}$, the TRC unit 50 sets the flag FS to 1 in step 114. Then, the TRC unit 50 sets the sub-throttle valve opening ratio $\theta_s$ to an initial target opening ratio $f_{(NE)}$ in step 116, and resets the flag FFBS to zero in step 118, the flag FFBS being an initial feedback control inhibit flag. Then, the TRC unit 50 ends execution of the routine.

The initial target opening ratio $f_{(NE)}$ of the sub-throttle valve 16 is selected on the basis of the engine speed NE and the road surface conditions. The sub-throttle valve 16 is maintained in the full-throttle state when the traction control is not performed. Hence, when feedback control is started in the full-throttle state of the sub-throttle valve 16, it takes a long time to respond to a variation in the sub-throttle valve opening ratio. With the above in mind, in step 116, the sub-throttle valve 16 is closed up to an opening ratio $(\theta_s)$ at which a response appears, at the same time as the traction control is started, and then the feedback control is started. The initial feedback control inhibit flag FFBS is set to 1 when a predetermined requirement is satisfied after the traction control is started.

When steps 112-118 have been executed until FS=1, the TRC unit 50 executes step 132 in which step it is determined, on the basis of the signal from the sub-throttle valve opening ratio sensor 36, whether or not the sub-throttle valve 16 has been closed to the initial target opening ratio $\theta_s$. When the result of step 132 is negative, the TRC 50 ends execution of the routine.

When the result of step 132 is YES, the TRC unit 50 executes step 134 in which step a feedback control inhibit flag FFBI is set to 1. In step 136 (FIG. 4), the TRC unit 50 determines whether or not the feedback inhibit flag FFBI is equal to 1. When the result of step 136 is YES, the TRC unit 50 ends execution of the routine. The feedback inhibit flag FFBI is a flag set in a shift-up control performed by the ECT unit of the control unit 30. More particularly, the feedback inhibit flag FFBI is set to 1 at the time of shift control by the ECT unit. When the ECT unit performs the shift-up control by the step 136 process, execution of the basic control routine (feedback control after step 140) with respect to the sub-throttle valve 16 is inhibited.

In step 138, the TRC unit 50 determines whether or not the initial feedback control inhibit flag FFBS is equal to 1. The feedback control from step 140 controls the sub-throttle valve opening ratio $\theta_s$. When the result of step 138 is NO, the TRC unit 0 ends execution of the routine without executing steps 140-154.

When the result of step 138 is YES, the TRC unit 50 executes step 140 from which step the feedback control of the sub-throttle valve opening ratio $\theta_s$ is started. When it is determined, in step 138, that FFBS=1, the TRC unit 50 determines a control quantity $\Delta\theta_s$ with respect to the sub-throttle opening ratio.

In step 142, the TRC unit 50 determines the target sub-throttle valve opening ratio $\theta_s$ by $\theta_s = \theta_{s(n-1)} + \Delta\theta_s$, and outputs a signal corresponding to the determined valve opening ratio $\theta_s$ to the stepping motor 18 for driving the sub-throttle valve 16. The traction control is continued while a condition remains satisfied and as long as a predetermined time has not elapsed. The above condition is such that the sub-throttle valve opening ratio $\theta_s$ is greater than the main throttle valve opening ratio $\theta_M$ (step 144), and the absolute value of the slip quantity $|V_S - V_D|$ is less than a predetermined value d (step 146). The above-mentioned predetermined time is measured by using a parameter CEND, which is incremented by 1 in step 148. In step 150, the TRC unit 50 determines whether or not the value of the parameter CEND is greater than D where D is the above-mentioned predetermined time.

When it is determined, in step 150, that the traction control should be terminated (when the result of step 150 is affirmative), the flags FS, FFBS and CEND are reset to zero, and the sub-throttle valve opening ratio $\theta_s$ is set to $\theta_{smax}$ (full-throttle state) in step 154. The control unit 30 is informed of the value of the flag FS set in step 114 (FIG. 3).

A description will now be given of a setting process for the main throttle valve opening ratio $\theta_M$ carried out by the EFI unit of the control unit 30, by referring to FIG. 5.

As has been described previously, the EFI unit of the control unit 30 is supplied with information indicating the engine speed NE, the main throttle valve opening ratio $\theta_M$, and the sub-throttle valve opening ratio $\theta_s$ and other sensor signals necessary for engine control. The control unit 30 performs the fuel injection control and the ignition timing control using the above information and sensor signals. The ECT unit of the control unit 30 controls the shift point most suitable for the current driving conditions on the basis of the vehicle speed SPD indicated by the vehicle sensor 35 and a coded stepwise main throttle valve opening ratio $\theta_{MG}$. The process shown in FIG. 5 is carried out in synchronism with the basic control routine of the traction control shown in FIGS. 3 and 4 with a period of 12 msec.

In step 200, the control unit 30 obtains the main throttle valve opening ratio $\theta_M$ from the output signal of the main throttle valve opening ratio sensor 34, and carries out a Gray code conversion operation on the valve opening ratio $\theta_M$, so that the coded main throttle valve opening ratio $\theta_{MG}$ can be obtained. For the sake of simplicity, the main throttle valve opening ratio (0%–100%) is converted into one of nine steps between $\theta_0$ (0%) and $\theta_8$ (100%).

After calculating the current coded main throttle valve opening ratio $\theta_{MG}$, the control unit 30 determines, in step 202, whether or not the traction control is being performed. This determination is performed by referring to the traction control execution flag FS (step 114 shown in FIG. 3) controlled by the TRC unit 50. When it is determined, in step 202, that the traction control is not being performed, the EFI unit of the control unit 30 executes step 208 and informs the ECT unit thereof of the coded main throttle valve opening ratio $\theta_{MG}$ calculated in step 200.

In step 204 it is determined whether the current main throttle valve opening ratio $\theta_{MG}$ is equal to a valve opening ratio at which slip because of gear shifting may occur. In other words, when it is determined that $\theta_{MG}$ is an upper guard value A %, the control unit 30 executes step 206 in which step a main throttle valve opening ratio $\theta_{MG-1}$ one step lower than the actual main throttle valve opening ratio $\theta_{MG}$ is set as the value $\theta_{MG}$.

Figure 6:
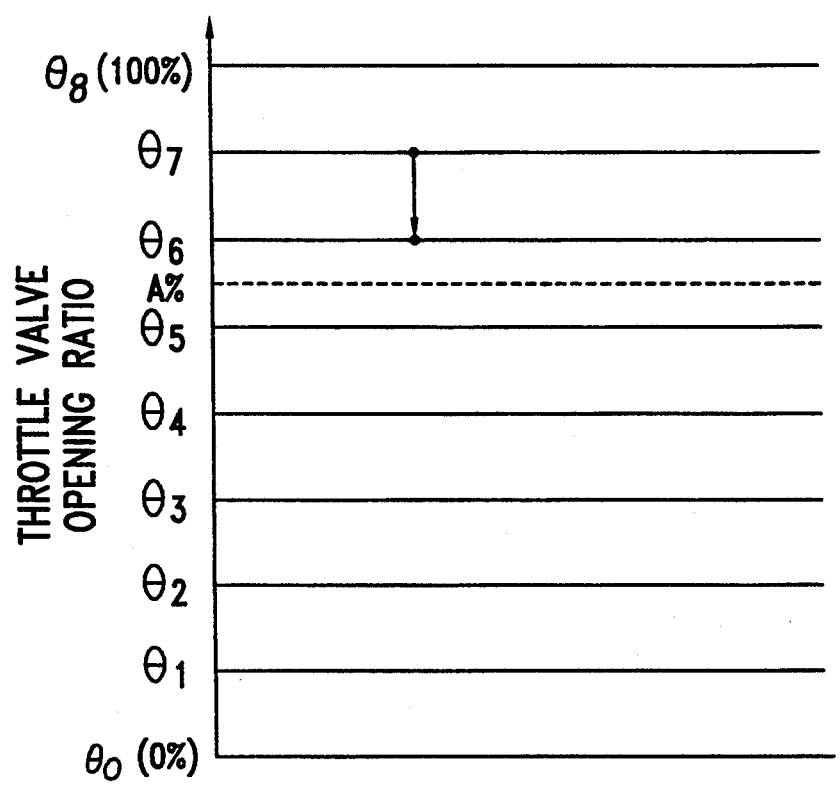
FIG. 6 is a block diagram of a process for setting the main throttle valve opening ratio.

The above process will be described in detail with reference to FIG. 6. It will be assumed that the coded actual main throttle valve opening ratio $\theta_{MG}$ obtained in step 200 is $\theta_7$ and the upper guard value A % is determined as shown in FIG. 6. It can be seen from FIG. 6 that the actual main throttle valve opening ratio $\theta_7$ is greater than the upper guard value A %. Hence, in step 206, a main throttle valve opening ratio $\theta_6$ one step lower than the main throttle valve opening ratio $\theta_7$, is set as the main throttle valve opening ratio $\theta_{MG}$. In step 208, the ECT unit is informed of the main throttle valve opening ratio $\theta_{MG}$ determined in the above manner.

When the result of step 204 is negative, that is, when it is determined that the current main throttle valve opening ratio $\theta_{MG}$ does not cause wheel slippage due to gear shifting, steps 204 and 206 are not executed, and the ECT unit is informed of the read main throttle valve opening ratio $\theta_{MG}$.

Figure 7:
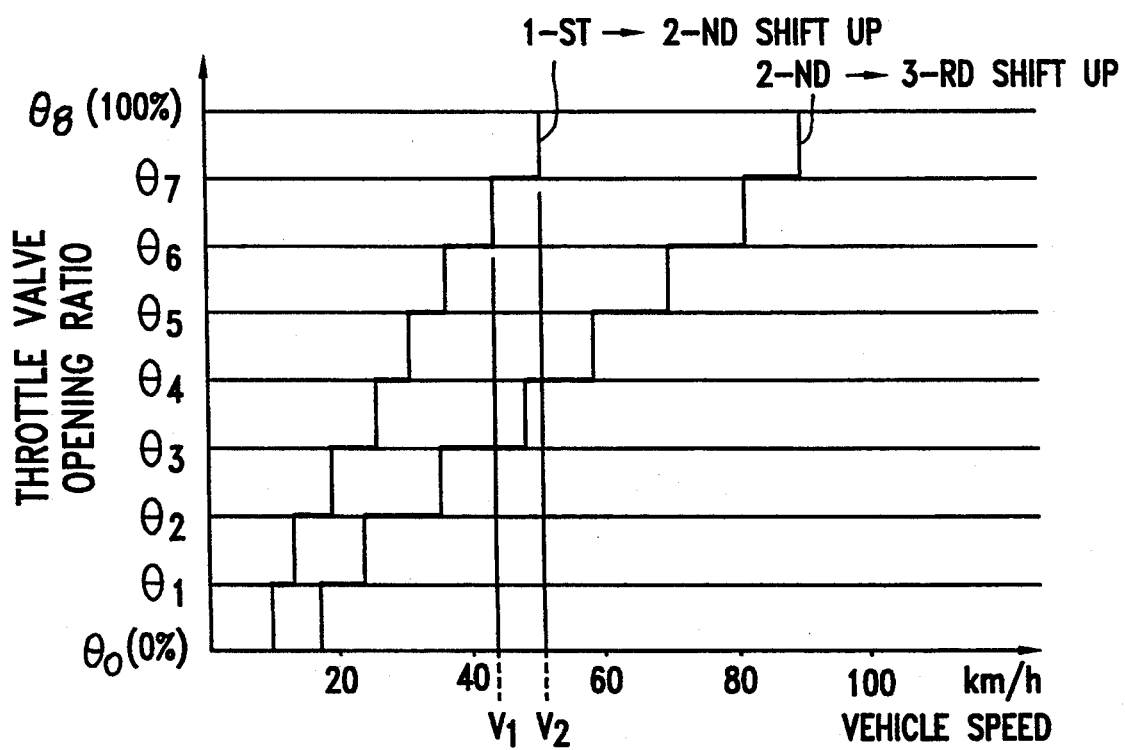
FIG. 7 is a graph showing how up-shifting is performed with respect to the throttle valve opening ratio and the vehicle speed.
Figure 8:
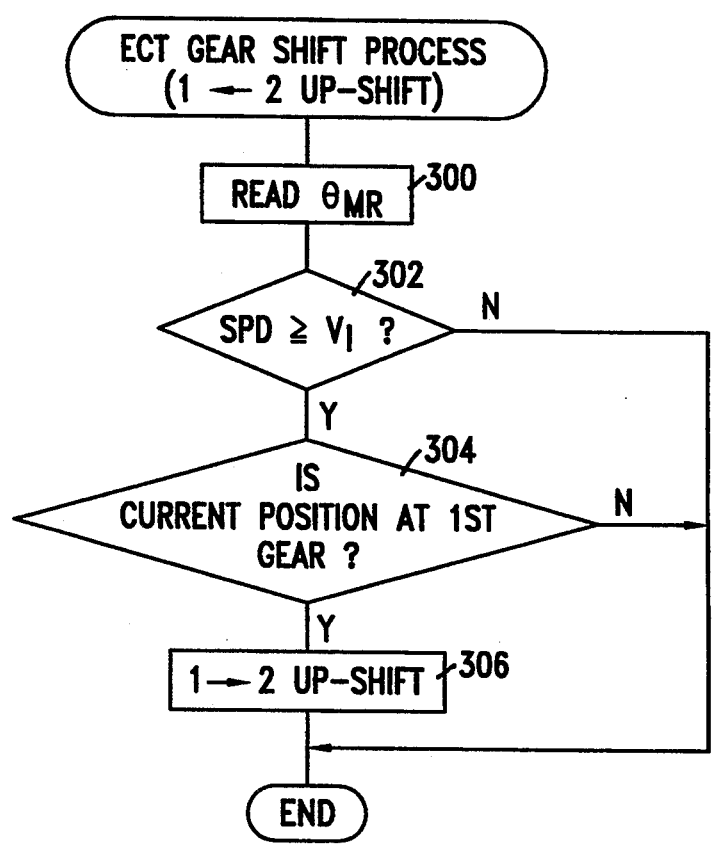
FIG. 8 is a flowchart of a gear shifting process executed by an ECT unit of the control unit shown in FIG. 2.

The gear shifting process carried out by the ECT unit will be described with reference to FIGS. 7 and 8. FIG. 7 shows up-shifting as a function of the throttle valve opening ratio and the vehicle speed. The ECT unit of the control unit 30 performs the gear shifting process on the basis of the diagram of FIG. 7. FIG. 8 is a flowchart of the gear shifting process performed by the ECT unit 30- The flowchart of FIG. 8 relates to a case wherein the gear is shifted from the first gear to the second gear.

When the gear shifting process shown in FIG. 8 is started, the ECT unit of the control unit 30 is informed of the main throttle valve opening ratio $\theta_{MG}$ sent from the EFI thereof in step 300. As has been described previously, the main throttle valve opening ratio $\theta_{MG}$ input in step 300 is set to a main throttle valve opening ratio one step lower than the actual main throttle valve opening ratio when the actual main throttle valve opening ratio is higher than the upper guard value A %. Further, the main throttle valve opening ratio $\theta_{MG}$ input in step 300 is equal to the actual main throttle valve opening ratio when it is not higher than the upper guard value A %.

In the following description, the following will be assumed. The main throttle valve opening ratio $\theta_{MG}$ input in step 300 is equal to $\theta_7$, which is higher than the upper guard value A %. Hence, by the process of steps 204 and 206, the main throttle valve opening ratio $\theta_{MG}$ is set equal to $\theta_6$.

In step 302, the ECT unit of the control unit 30 determines whether or not the vehicle speed SPD indicated by the sensor output signal of the speed sensor 35 is equal to or greater than a threshold vehicle speed $V_1$. When the vehicle speed is equal to or greater than the threshold speed $V_1$, the ECT unit executes step 304 in which step it is determined that the current gear shift position is at the first gear. When it is determined that the current shift position is at the first gear, the ECT unit executes step 306 in which step the ECT unit performs the up-shifting process from the first gear to the second gear.

As has been described previously, the ECT unit performs the gear shifting process on the basis of the main throttle valve opening ratio $\theta_{MG}$ sent from the EFI. More particularly, in the setting process of the main throttle valve opening ratio $\theta_{MG}$ by the EFI unit, when the actual main throttle valve opening ratio $\theta_{MG}$ is higher than the upper guard value A %, data indicating the main throttle valve opening ratio $\theta_{MG-1}$ lower than the actual one by one step is sent to the ECT unit.

By way of example, in the ECT gear shifting process shown in FIG. 8, if the actual main throttle valve opening ratio $\theta_7$ is used without any change, up-shifting from the first gear to the second gear is performed when the vehicle speed SPD is equal to a speed $V_2$, as shown in FIG. 7. On the other hand, according to the present embodiment, the main throttle valve opening ratio $\theta_6$ lower than the actual main throttle valve opening ratio $\theta_7$ is used instead of the actual main throttle valve opening ratio $\theta_7$. Hence, up-shifting from the first gear to the second gear is performed when the vehicle speed SPD is equal to $V_1$ ($V_2 > V_1$). Hence, according to the present embodiment, up-shifting is made at an engine speed which is lower than the conventional engine speed (corresponding to $V_2$) by an engine speed corresponding to the difference between the vehicle speeds V1 and V2. The above up-shifting process is equivalent to a process in which the shifting point is changed towards the low-engine-speed side.

As described above, according to the present embodiment, the shift point of the up-shifting process is changed to the low-engine-speed side when the degree of depression of the accelerator pedal 12 is equal to or greater than the threshold value and the main throttle valve opening ratio $\theta_{MG}$ is higher than the upper guard value A %. Hence, the engine speed can be reduced when up-shifting is made, and the unstable behavior of the vehicle due to gear shifting performed when the vehicle is traveling on a slippery (low-μ) road can be effectively prevented.

When traction control is not being performed and the main throttle valve opening ratio $\theta_{MG}$ is less than the upper guard value A %, there is little wheel slippage due to gear shifting. In this case, the gear shifting is performed on the basis of the actual main throttle valve opening ratio $\theta_{MG}$. Hence, the engine 10 responds to manipulation of the accelerator pedal 12 until the degree of depression of the accelerator pedal 12 by the driver exceeds the upper guard value A %. Hence, the driver does not feel uncomfortable.

Figure 5:
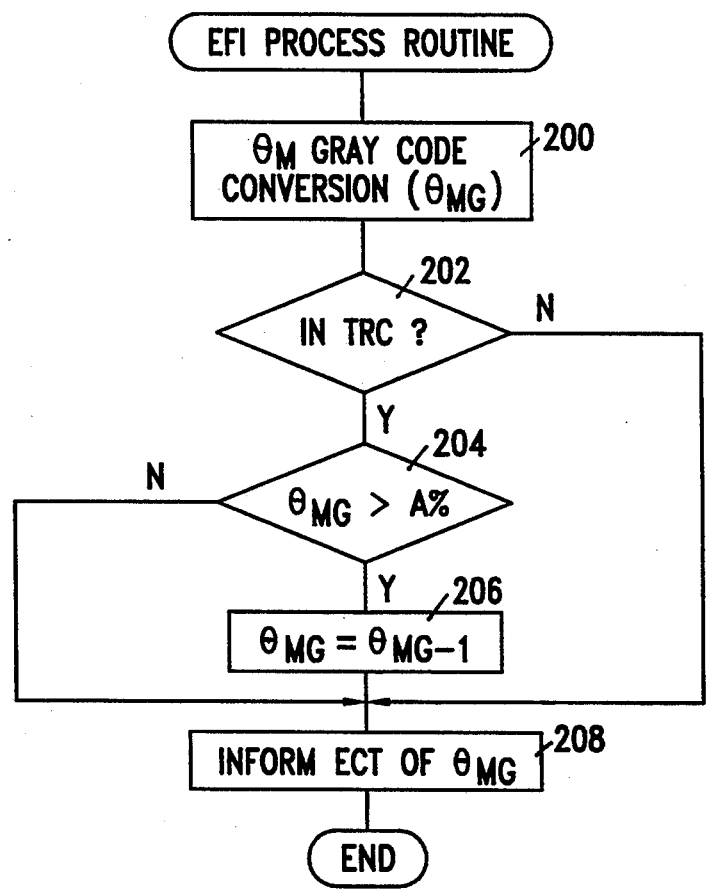
FIG. 5 is a flowchart of a process for setting a main throttle valve opening ratio executed by an EFI unit of a control unit shown in FIG. 2.
Figure 9:
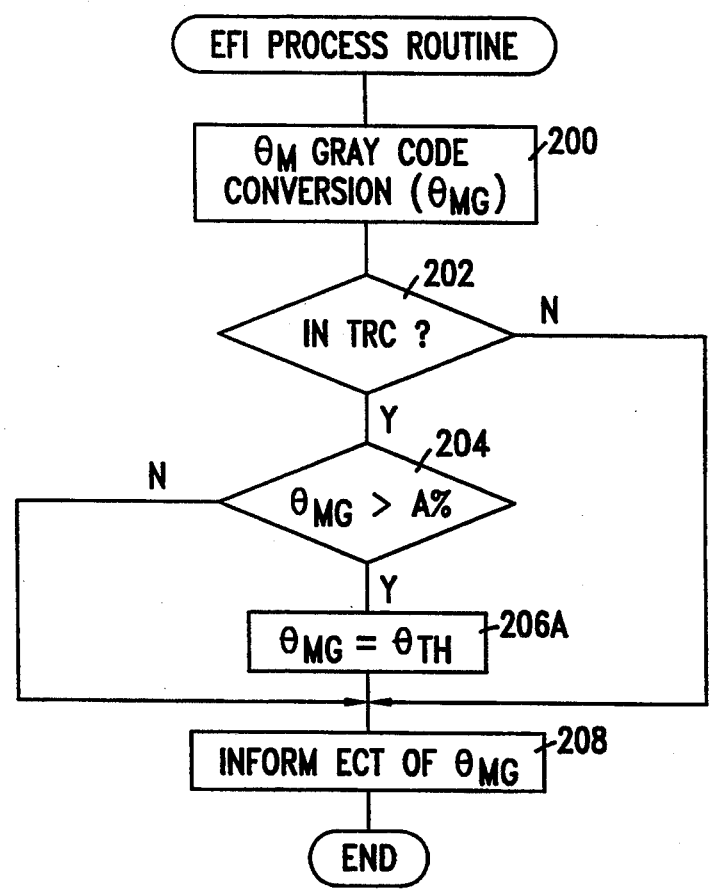
FIG. 9 is a flowchart of a variation of the process for setting the main throttle valve opening ratio executed by the EFI unit.

In step 206 shown in FIG. 5, the main throttle valve opening ratio $\theta_{MG-1}$ lower than the actual main throttle valve opening ratio $\theta_{MG}$ by one step is used instead of the valve opening ratio $\theta_{MG}$ when the actual valve opening ratio $\theta_{MG}$ exceeds the upper guard value A %. For example, when the actual main throttle valve opening ratio $\theta_{MG}$ is $\theta_8$, $\theta_7$ is used instead of $\theta_8$, and when $\theta_{MG}$ is $\theta_7$, $\theta_6$ is used instead of $\theta_7$. It is possible to employ step 206A shown in FIG. 9 instead of step 206 shown in FIG. 5. In step 206A, when the actual main throttle valve opening ratio $\theta_{MG}$ exceeds the upper guard value A %, the main throttle valve opening ratio to be used is set to a predetermined constant ratio $\theta_{TH}$ without exception. By using the predetermined constant ratio $\theta_{TH}$, the occurrence of wheel slippage can be effectively prevented, particularly when the degree of depression of the accelerator pedal 12 is great.

The up-shifting process from the first gear to the second gear in the state in which the main throttle valve opening ratio is $\theta_6$ was explained with reference to FIG. 8. The up-shifting process with respect to other gear shifting and other main throttle valve opening ratios will be carried out in the same manner as has been explained previously.

In the aforementioned embodiment, the constant upper guard value A % is used. Alternatively, it is possible to change the upper guard value in accordance with the slip ratio $(V_S-V_R)/V_R$. In this case, it will be convenient to use a table mapping slip ratios and suitable upper guard values.

In the aforementioned embodiment, the shift point is changed to a shift point lower than the normal shift point during execution of the traction control. Alternatively, it is possible to use a first shift point map to be used when the traction control is OFF and a second shift point map to be used when the traction control is ON and to select either the first shift point map or the second shift point map.

In order to perform the traction control, the wheel speed sensors 22a and 22b are provided for the driving wheels 3a and 3b, respectively. Alternatively, it is possible to use, instead of the wheel speed sensors 22a and 22b, a single revolution speed sensor for detecting the revolution of the drive shaft 26. By using the above single revolution speed sensor, the number of sensors used can be reduced, and it is no longer necessary to take into account the difference between the right wheel speed and the left wheel speed.

In the previously described embodiment, the engine 10 is equipped with the main throttle valve 14 and the sub-throttle valve 16. However, the present invention can be applied to an engine in which the traction control is performed using a single throttle valve provided for the engine. In this case, the quantity of depression of the accelerator pedal 12 is used as the main throttle opening ratio, and the main throttle valve opening ratio is used as the sub-throttle valve opening ratio.

The present invention is not limited to the specifically disclosed embodiments, and variations and modifications may be made without departing from the scope of the present invention.

What is claimed is:

1. An automatic transmission control system provided for an internal combustion engine having a first throttle valve coupled to an accelerator pedal and an automatic transmission system the automatic transmission control system comprising:
   a traction control system which operates, when wheel slippage occurs, to reduce a degree of opening of the first throttle valve away from a degree of opening of the first throttle valve corresponding to a degree of operation of the accelerator pedal;
   detection means for detecting a degree of operation of the accelerator pedal;
   shift point setting means, coupled to the detection means, for setting a shift point so that, when a predetermined operating condition is not met, gear shifting occurs at an engine speed corresponding to the degree of operation of the accelerator pedal and, when the predetermined operating condition is met, gear shifting occurs at an engine speed lower than the predetermined engine speed corresponding to the detected degree of operation of the accelerator pedal, wherein the predetermined condition is met when the degree of operation of the accelerator pedal is greater than a predetermined degree of operation and the traction control system is operating, wherein the shift point setting means sets the shift point, when the predetermined operating condition is met on the basis of a value corresponding to a degree of operation of the accelerator pedal less than the detected degree of operation of the accelerator pedal; and
   first means, coupled to the shift point setting means, for determining whether the traction control system is operating.

2. The automatic transmission control system as claimed in claim 1, further comprising:
   a second throttle valve; and
   driving means coupled to the traction control system for driving the second throttle valve,
   wherein said detection means comprises first means for detecting a throttle valve opening ratio, wherein the throttle valve opening ratio is a ratio of a degree of opening of the first throttle valve to the degree of operation of the accelerator pedal.

3. The automatic transmission control system as claimed in claim 2, wherein said shift point changing means comprises:
   second means for converting each of the throttle valve opening ratios detected by said first means into a corresponding predetermined stepwise throttle valve ratio; and third means for selecting, when the predetermined operating condition is met, a predetermined stepwise throttle valve opening ratio which is one step lower than the predetermined stepwise throttle valve opening ratio corresponding to the throttle valve opening ratio detected by said first means.

* * * * *

UNITED STATES PATENT AND TRADEMARK OFFICE
CERTIFICATE OF CORRECTION

PATENT NO. : 5,405,301
DATED : April 11, 1995
INVENTOR(S) : Yoshifumi YAGI, et al.

Page 1 of 2

It is certified that error appears in the above-indentified patent and that said Letters Patent is hereby corrected as shown below:

Column 4, line 52, change "ratio" to --rate--.

Column 4, line 57, before "operation" at the end of the line, insert --traction control--.

Column 6, line 44, change "unit 0" to --unit 50--.

Column 7, line 22, between "vehicle" and "sensor" insert --speed--.

Column 8, line 3, delete "read".

Column 8, line 12, change "30-" to --30.--.

Column 8, lines 52 and 53, change "lower than the actual one by one step" to --one step lower than the actual main throttle valve opening ratio $\vartheta_{MG}$,--.

Column 8, line 60, change "the main throttle valve opening ratio $0_6$ lower than the actual main throttle valve opening ratio $0_7$" to --a lower main throttle valve opening ratio $0_6$--.

UNITED STATES PATENT AND TRADEMARK OFFICE
CERTIFICATE OF CORRECTION

PATENT NO. : 5,405,301
DATED : April 11, 1995
INVENTOR(S) : Yoshifumi YAGI, et al.

It is certified that error appears in the above-indentified patent and that said Letters Patent is hereby corrected as shown below:

Column 9, line 27, change "lower than the actual main throttle valve opening ratio $0_{MG}$ by one step" to --, one step lower than the actual main throttle valve opening ratio $0_{MG}$, --.

Column 9, line 48, change "will be carried out" to --are performed--.

Signed and Sealed this

Seventeenth Day of October, 1995

Attest:

BRUCE LEHMAN

*Attesting Officer*     *Commissioner of Patents and Trademarks*